(12) United States Patent
Basso et al.

(10) Patent No.: US 11,435,029 B2
(45) Date of Patent: Sep. 6, 2022

(54) MAGNETIC DEVICE FOR CAPTURING METAL WEAR PARTICLES IN SUSPENSION IN A LUBRICATION FLUID

(71) Applicant: AIRBUS HELICOPTERS, Marignane (FR)

(72) Inventors: Benoit Basso, Ventabren (FR); John Le Ru, Tauxigny (FR); Damien Goujet, Sausset les Pins (FR)

(73) Assignee: AIRBUS HELICOPTERS, Marignane (FR)

( * ) Notice: Subject to any disclaimer, the term of this patent is extended or adjusted under 35 U.S.C. 154(b) by 289 days.

(21) Appl. No.: 16/574,441

(22) Filed: Sep. 18, 2019

(65) Prior Publication Data

US 2020/0088350 A1 Mar. 19, 2020

(30) Foreign Application Priority Data

Sep. 19, 2018 (FR) ...................................... 1800986

(51) Int. Cl.
*B03C 1/28* (2006.01)
*F16N 39/06* (2006.01)
*F01M 1/10* (2006.01)

(52) U.S. Cl.
CPC ............... *F16N 39/06* (2013.01); *B03C 1/28* (2013.01); *B03C 2201/20* (2013.01);
(Continued)

(58) Field of Classification Search
CPC .... F16N 39/06; F16N 39/005; F16N 2200/04; B03C 1/28; B03C 2201/20;
(Continued)

(56) References Cited

U.S. PATENT DOCUMENTS

| 2,462,715 A | 2/1949 | Booth |
| 3,869,391 A | 3/1975 | Kramer |

(Continued)

FOREIGN PATENT DOCUMENTS

| EP | 0116468 A1 | 8/1984 |
| EP | 0398800 A1 | 11/1990 |

(Continued)

OTHER PUBLICATIONS

French Search Report for French Application No. FR 1800986, Completed by the French Patent Office, dated Jul. 3, 2019, 11 pages.

*Primary Examiner* — Waqaas Ali
(74) *Attorney, Agent, or Firm* — Brooks Kushman P.C.

(57) ABSTRACT

A magnetic device for capturing metal wear particles in suspension in a lubrication fluid, the magnetic device being for inserting in a straight-line insertion direction of the magnetic device into a wall of a casing via a through orifice serving to put an inside volume of the casing containing the lubrication fluid into communication with an outside volume outside the casing, the magnetic device presenting a longitudinal axis X, the longitudinal axis X being for putting into coincidence with the direction for inserting the magnetic device into the casing, the magnetic device comprising a permanent magnet suitable for attracting the metal particles and a presence-detector member for detecting the metal particles attracted by the permanent magnet.

20 Claims, 5 Drawing Sheets

(52) U.S. Cl.
CPC ............ *B03C 2201/32* (2013.01); *F01M 1/10* (2013.01); *F01M 2001/1042* (2013.01)

(58) Field of Classification Search
CPC .................. B03C 2201/32; F01M 1/10; F01M 2001/1042; F01M 2001/1028; F01M 11/03; G01N 2015/0053; G01N 15/0606; G01N 15/0656
See application file for complete search history.

(56) References Cited

U.S. PATENT DOCUMENTS

| | | | |
|---|---|---|---|
| 4,323,843 A | 4/1982 | Batham | |
| 4,731,578 A | 3/1988 | Tsaprazis | |
| 4,831,362 A | 5/1989 | Tsaprazis | |
| 5,027,065 A | 6/1991 | Bares et al. | |
| 5,264,832 A * | 11/1993 | Parmer | G01V 3/02 324/204 |
| 5,384,535 A | 1/1995 | Mayeur | |
| 5,634,755 A | 6/1997 | Jones, Jr. | |
| 2015/0177116 A1 | 6/2015 | Kudrna | |

FOREIGN PATENT DOCUMENTS

| | | |
|---|---|---|
| EP | 0576306 A1 | 12/1993 |
| EP | 3279650 A1 | 2/2018 |
| FR | 2443691 A1 | 7/1980 |
| FR | 2564897 A1 | 11/1985 |
| FR | 2581455 A1 | 11/1986 |
| FR | 2598818 A1 | 11/1987 |
| GB | 590173 A | 7/1947 |
| GB | 2029580 A | 3/1980 |
| WO | 2017157855 A1 | 9/2017 |

\* cited by examiner

MAGNETIC DEVICE FOR CAPTURING METAL WEAR PARTICLES IN SUSPENSION IN A LUBRICATION FLUID

CROSS-REFERENCE TO RELATED APPLICATIONS

This application claims priority to French patent application No. FR 1800986 filed on Sep. 19, 2018, the disclosure of which is incorporated in its entirety by reference herein.

BACKGROUND OF THE INVENTION

(1) Field of the Invention

The present invention relates to the field of magnetic devices serving to isolate, to hold in place, and to capture metal wear particles that are in suspension in a lubrication fluid. In particular, such a lubrication fluid may be oil for lubricating power transmission members, an engine, or any mechanical system presenting parts that move relative to one another.

More precisely, such magnetic devices are generally fitted to a wall of a casing of the mechanical system bypassing through the wall. Thus, such mechanical devices can be removed from outside the casing.

(2) Description of Related Art

In a first type of magnetic device, and as described in Documents US 2015/177116, U.S. Pat. Nos. 3,869,391, 2,462,715, GB 590 173, U.S. Pat. No. 5,634,755, FR 2 564 897, EP 0 398 800, and EP 0 576 306, it is known to make use of a permanent magnet presenting a shape that is cylindrical between two ends that are plane and parallel. Also, such a cylindrical shape has an axis of symmetry that coincides with a straight-line direction for inserting the magnetic device in the wall of the casing to which the magnetic device is fitted.

Furthermore, those magnetic devices complying with that first type also have two pole pieces arranged at the two plane and parallel ends of the permanent magnet and serving to generate a "radial" magnetic force of attraction over 360° all around their cylindrical walls. The metal wear particles in suspension in the lubrication fluid are then captured and held in place against the cylindrical wall of the permanent magnet between the two pole pieces.

Nevertheless, such a cylindrical wall does not constitute the zone of maximum attraction of the permanent magnet. Specifically, the metal wear particles are attracted by the two pole pieces, leading to at least one bridge of metal wear particles being formed along the cylindrical wall of the permanent magnet. Since the magnetic force of attraction is not at its maximum, the quantity of metal particles captured by such magnetic devices generating a "radial" magnetic force of attraction is thus limited and not very representative of the real wear of the parts that move relative to one another and that are contained in the casing.

Magnetic devices of a second type are also known that serve to generate an "axial" magnetic force of attraction at a free end. Such magnetic attraction devices are described in particular in Documents EP 0 116 468, GB 2 029 580, FR 2 443 691, FR 2 581 455, FR 2 598 818, WO 2017/157855, and EP 3 279 650.

The metal wear particles in suspension in the lubrication fluid are then captured and held in place at the free end of the permanent magnet formed by a first and second pole pieces that are juxtaposed one beside the other.

Nevertheless, juxtaposing two pole pieces in that way does not enable a maximum force of attraction to be generated all around the permanent magnet. Specifically, the metal wear particles are attracted by the two pole pieces, leading to at least one bridge of metal wear particles being formed solely at the free end of the permanent magnet. Since the magnetic force of attraction is axial only at the free end, the quantity of metal particles captured by such magnetic devices is thus likewise limited and not very representative of the real wear of the parts that move relative to one another and that are contained in the casing.

Also, Document U.S. Pat. No. 5,264,832 describes a magnetic device for capturing metal wear particles in suspension in a lubrication fluid. That, device has one or two permanent, magnets for attracting metal particles, together with a detector member formed by two electrical conductors extending facing the pole faces of the permanent magnet(s).

Nevertheless, such a document does not disclose a particular longitudinal dimension for the pole faces of the permanent magnet, which dimension is parallel to a longitudinal axis X. Specifically, only a particular thickness for the permanent magnet is disclosed in that document.

Thus, the magnetic force of attraction acting radially facing each of the two pole faces is not optimized, and the magnetic device does not enable all of the magnetic particles that are in suspension in the lubrication fluid to be captured.

BRIEF SUMMARY OF THE INVENTION

An object of the present invention is thus to propose a magnetic device that makes it possible to avoid the above-mentioned limitations. Specifically, such a magnetic device in accordance with the invention serves to generate a maximum force of attraction while capturing metal wear particles radially along at least two mutually distinct directions.

The invention thus relates to magnetic device for capturing metal wear particles in suspension in a lubrication fluid, the magnetic device being for inserting in a straight-line insertion direction of the magnetic device into a wall of a casing via a through orifice serving to put an inside volume of the casing containing the lubrication fluid into communication with an outside volume outside the casing, the magnetic device presenting a longitudinal axis X, the longitudinal axis X being for putting into coincidence with the direction for inserting the magnetic device into the casing, the magnetic device comprising:

at least one permanent magnet suitable for attracting the metal particles, the permanent magnet(s) having at least two pole faces of mutually different polarities; and at least one presence-detector member for detecting the presence of the metal particles attracted by the permanent magnet(s), the pole faces extending respectively mainly along the longitudinal axis, and the presence-detector member(s) for detecting the presence of metal particles being arranged, in full or in part, facing the pole faces.

In other words, each of the at least two pole faces serves to attract metal particles radially in at least two directions directly towards their respective surfaces. Furthermore, these pole faces present respective plane or curved surfaces having a largest dimension extending along the longitudinal axis X of the magnetic device.

The relative positioning of the detector member(s) facing the pole faces serves to detect the presence of metal particles directly in the magnetic attraction zone that presents a maximum force of attraction of the permanent magnet.

According to the invention, such a device is remarkable in that each of the pole faces presents a respective longitudinal dimension parallel to the longitudinal axis X lying in the range 1 millimeter (mm) to 50 mm, and preferably in the range 5 mm to 30 mm.

Specifically, such a longitudinal dimension is optimum for enabling a maximum magnetic force of attraction to be generated radially facing each of the at least two pole faces.

Advantageously, the permanent magnet(s) may occupy an outside volume of shape selected from the group comprising cylinders and rectangular parallelepipeds. Specifically, such shapes enable each of the at least two pole faces to present a maximum surface area and thus to generate as great as possible a force of magnetic attraction.

Also, such a cylindrical shape for the permanent magnet can be positioned in various different orientations. A first orientation may consist in positioning an axis of symmetry of the cylindrical shape perpendicularly relative to the longitudinal axis X. Under such circumstances, the at least two pole faces are then formed by faces that are plane, partially spherical, or rounded, and that are arranged at the ends of the cylindrical shape.

A second orientation may consist in positioning an axis of symmetry of the cylindrical shape along the longitudinal axis X. Under such circumstances, the at least two pole faces are then formed by faces that are partially cylindrical and that are arranged around the longitudinal axis X.

Furthermore, such a magnetic device may have a plurality of permanent magnets that are juxtaposed in various ways.

Thus, in a first advantageous configuration of the invention, the magnetic device may comprise at least two permanent magnets arranged one beside the other in a first offset direction that is oriented parallel relative to the longitudinal, axis X.

Under such circumstances, the pole faces that are juxtaposed one beside another are advantageously of the same polarity. Furthermore, the at least two permanent magnets may be arranged against one another or they may be spaced apart from one another by a predetermined non-zero distance along the longitudinal axis X.

In a second advantageous configuration of the invention, the magnetic device may have at least two permanent magnets arranged one above the other in a second offset direction that is oriented perpendicularly relative to the longitudinal axis X.

As above, the at least two permanent magnets may be arranged against one another or they may be spaced apart from one another by a predetermined non-zero distance perpendicularly to the longitudinal axis X. Also, the facing pole faces of the at least two permanent magnets are of mutually opposite polarities.

In a first variant of the invention, the permanent magnet(s) may be of unipolar type having two pole faces of mutually different polarities, the two pole faces being oriented symmetrically relative to the longitudinal axis X.

Such a unipolar, first type of permanent magnet conventionally comprises one pole of a first polarity arranged at a first end of the magnet and another pole of a second polarity opposite to the first polarity arranged at a second end of the magnet.

In a second variant of the invention, the permanent magnet(s) may be of multipolar type, having at least four pole faces that are oriented radially relative to the longitudinal axis X, the pole faces being arranged one beside another and being of mutually different polarities in pairs.

Such a multipolar, second type of permanent magnet may be manufactured by a sintering process and may consist in a monolithic unit made out of a neodymium, iron, and boron alloy generally referred to by the chemical formula $Nd_2Fe_{14}B$. Under such circumstances, the various different pole faces may be formed by a plurality of juxtaposed cylindrical portions when the volume occupied by the permanent magnet is a cylinder, or else by a plurality of plane faces when the volume occupied by the permanent magnet is a rectangular parallelepiped.

In practice, the permanent magnet(s) may include at least one longitudinal hole extending parallel relative to the longitudinal axis X, the longitudinal hole(s) being one or more through holes between a proximal face of the permanent magnet(s) and a distal face of the permanent magnet(s).

In particular, these longitudinal hole(s) may serve to secure the permanent magnet to a support, for fastening the magnetic device and/or to pass electrically conductive wires to make it possible to detect the presence of metal particles attracted by the permanent magnet(s).

Advantageously, the permanent magnet(s) may include at least one transverse hole extending perpendicularly relative to the longitudinal axis X, the transverse hole(s) being one or more through holes between a first pole face of the permanent magnet(s) and a second pole face of the permanent magnet(s).

As above, these transverse hole(s) may serve in particular to secure the permanent magnet to a support for fastening the magnetic device and/or to pass electrically conductive wires to make it possible to detect the presence of metal particles attracted by the permanent magnet(s).

Furthermore, such a magnetic device may include various different types of presence-detector member(s) for detecting the presence of metal particles and they may correspond to various different embodiments as described below or indeed they may consist in a combination of at least two of these embodiments.

Thus, in a first embodiment of the invention, the presence-detector member(s) for detecting the presence of metal particles may comprise at least two electrically conductive bars, a first bar being arranged facing a first pole face of positive (or north) polarity and a second bar being arranged facing a second pole face of negative (or south) polarity.

In other words, the presence of metal particles may be detected by the closing of an initially-open electrical circuit between a first electrode formed by each electrically conductive bar and a plane second electrode arranged facing it. Metal particles accumulating radially in thickness in a direction perpendicular to the longitudinal axis X and coming into contact both with an electrically conductive bar and with the plane second electrode then serve to close the initially-open electrical circuit.

Also, the plane second electrode may be formed directly by the material constituting the permanent magnet or indeed by a sheet of conductive material fitted to and/or adhesively bonded on the surface of the permanent magnet.

In a second embodiment of the invention, the presence-detector member(s) for detecting the metal particles comprise(s) two groups of two oriented sheets of electrically conductive wires forming a grid or an open weave textile, a first group being arranged facing a first pole face of positive (or north) polarity and a second group being arranged facing a second pole face of negative (or south) polarity.

Under such circumstances, the presence of metal particles may be detected by the closing of an initially-open electrical circuit between a first electrode formed by each oriented sheet of electrically conductive wires and a plane second electrode arranged facing it. Metal particles accumulating radially in thickness in a direction perpendicular to the longitudinal axis X and coming into contact both with an oriented sheet of electrically conductive wires and with the plane second electrode then serves to close the initially-open electrical circuit.

As described above, the plane second electrode may be formed directly by the material constituting the permanent magnet or indeed by a sheet of conductive material fitted and/or adhesively bonded to the surface of the permanent magnet.

In a third embodiment of the invention, the presence detection member(s) for detecting the presence of metal particles may comprise two electrically conductive perforated plates, a first plate being arranged facing a first pole face of positive (or north) polarity and a second plate being arranged facing a second pole face of negative (or south) polarity.

Thus, the presence of metal particles may be detected by the closing of an initially-open electrical circuit between a first electrode formed by each electrically conductive perforated plate and a plane second electrode arranged facing it. In particular, the electrically conductive perforated plate may be formed by a metal sheet provided with a plurality of holes of shape that is square, rectangular, or circular.

Metal particles accumulating radially in thickness in a direction perpendicular to the longitudinal axis X and coming into contact both with the electrically conductive perforated plate and with the plane second electrode then serve to close the initially-open electrical circuit.

As above, the plane second electrode may be formed directly by the material constituting the permanent magnet or indeed by a sheet of conductive material fitted to and/or adhesively bonded on the surface of the permanent magnet.

In a fourth embodiment of the invention, the presence-detector member(s) for detecting the metal particles may comprise two printed circuits, each having two different electrically conductive tracks that are electrically insulated from each other, a first, printed circuit being arranged facing a first pole face of positive (or north) polarity and a second printed circuit being arranged facing a second pole face of negative (or south) polarity.

Thus, on each of the first and second printed circuits, the presence of metal particles may be detected by the closing of an initially-open electrical circuit between a first electrode formed by a first electrically conductive track and a second electrode formed by a second electrically conductive track juxtaposed with the first track. In particular, each of the first and second printed circuits may be formed by depositing conductive material on an insulating support or by metal sheets that are cut out or machined.

Metal particles accumulating longitudinally or transversely, e.g. in a direction parallel to the longitudinal axis X, and coming into contact, both with the first track and with the second track then serve to close the initially-open electrical circuit. Each of the first and second printed circuits presents the advantages of not giving rise to thickness gaps in which metal particles could be received and of being of relatively small thickness, thus making it possible to use a permanent magnet of large dimensions and therefore capable of generating a large magnetic force of attraction.

In a fifth embodiment of the invention, the presence-detector member(s) for detecting metal particles may comprise one or more monolithic units surrounding the permanent magnet(s), at least in part, covering a first pole face of positive (or north) polarity and a second pole face of negative (or south) polarity.

By way of example, such a monolithic unit may consist in an electrically conductive perforated plate forming a first electrode in compliance with the third embodiment of the invention.

Nevertheless, in another example of the fifth embodiment of the invention, the monolithic unit may advantageously perform both a first electrode and a second electrode.

Under such circumstances, the monolithic unit may then form a printed circuit having two different electrically conductive tracks that are electrically insulated from each other.

As above, the presence of metal particles may be detected by the closing of an initially-open electrical circuit between a first electrode formed by a first electrically conductive track and a second electrode formed, by a second electrically conductive track juxtaposed with the first track. In particular, the printed circuit may be formed by depositing conductive material on an insulating support or by metal sheets that are cut out or machined.

Metal particles accumulating longitudinally or transversely, e.g. in a direction parallel to the longitudinal axis X, and coming into contact both with the first track and with the second track then serve to close the initially-open electrical circuit. Such a printed circuit presents the advantages of not giving rise to thickness gaps in which metal particles could be received and of being of relatively small thickness, thus making it possible to use a permanent magnet of large dimensions and therefore capable of generating a magnetic force of attraction that is large.

In practice, the printed circuit may surround the permanent magnet (s) completely, the printed circuit occupying an outside volume of shape selected from the group comprising cylinders and rectangular parallelepipeds.

In particular, such an arrangement makes it possible to have a single electrical connection for the presence-detector member for detecting metal particles and to cover the various different pole faces of the permanent magnet completely.

In a sixth embodiment of the invention the presence-detector member(s) for detecting the metal particles may comprise a plurality of electrically conductive hollow plates that are separated from one another by a plurality of electrically insulating hollow plates, the electrically conductive hollow plates and the insulating hollow plates being arranged parallel to one another and perpendicularly relative to the longitudinal axis X.

In other words, the permanent magnet(s) is/are inserted into a plurality of central orifices formed in the various different hollow plates. Having alternating electrically conductive hollow plates and electrically insulating hollow plates serves to form two different electrically conductive electrodes that are electrically insulated from each other.

Thus, the presence of metal particles can be detected by closing an initially-open electrical circuit between a first electrode formed by a first set of electrically conductive hollow plates and a second electrode formed by a second set of electrically conductive hollow plates. In particular, the electrically conductive hollow plates and the electrically insulating hollow plates may be formed by a cutting out or machining process.

Metal particles accumulating longitudinally or transversely, e.g. along a direction parallel to the longitudinal axis X, and coming into contact both with the first set of electrically conductive hollow plates and with the second set of electrically conductive hollow plates then serve to close the initially-open electrical circuit. Like a printed circuit, having alternating electrically conductive hollow plates and electrically insulating hollow plates presents the advantages of not giving rise to thickness gaps in which the metal particles could be received, and of being of relatively small thickness, thus making it possible to use a permanent magnet of large dimensions and therefore capable of generating a magnetic force of attraction that is large.

Advantageously, each of the electrically conductive hollow plates and of the insulating hollow plates nay present at least two respective through bores, first bores in the electrically conductive hollow plates and in the insulating bellow plates being in mutual alignment along a first axis X' and second bores in the electrically conductive hollow plates and in the insulating hollow plates being in mutual alignment along a second axis X", the first and second axes X' and X" being parallel to the longitudinal axis X.

Thus, each of the electrically conductive hollow plates and of the electrically insulating hollow plates respectively includes at least two through bores arranged on either side of the central orifice receiving the permanent magnet(s). These at least two through bores thus also extend parallel relative to the central orifice arranged in each of the hollow plates.

In particular, these at least two through bores may serve to secure the presence-detector member(s) for detecting metal particles to a support for fastening the magnetic device, and/or to pass electrically conductive wires so as to be able to detect the presence of metal particles attracted by the permanent magnet(s) to the outside surfaces of the hollow plates that are to be in contact with the lubrication fluid.

In practice, the magnetic device may include a shutter arranged facing a distal face of the permanent magnet(s) and perpendicularly relative to the longitudinal axis X, each of the electrically conductive hollow plates and of the insulating hollow plates presenting at least two respective notches arranged symmetrically relative to the longitudinal axis X, these notches being suitable for receiving two branches parallel to the longitudinal axis X, the two branches being secured to the shutter.

In other words, such a shutter is associated with resilient return means enabling the casing to be shut automatically when the permanent magnet(s) and the presence-detector member(s) for detecting the presence of metal particles are extracted from the magnetic device.

Also, the shutter is movable in translation relative to the support for fastening the magnetic device and it is moved in a first travel direction parallel to the longitudinal axis X towards a shut position by using the resilient return means. In contrast, when the permanent magnet(s) and the presence-detector member(s) for detecting metal particles are inserted once more into the support for fastening the magnetic device, the shutter is moved towards an open position in a second travel direction opposite to the first travel direction.

Furthermore, such a shutter may include an O-ring that, in the shut position, once the permanent magnet(s) and the presence-detector member(s) for detecting metal particles have been extracted from the magnetic device serves to provide sealing between the inside volume and the volume outside the casing.

BRIEF DESCRIPTION OF THE DRAWINGS

The invention and its advantages appear in greater detail in the context of the following description of embodiments given by way of illustration and with reference to the accompanying figures, in which.

Elements that appear in more than one of the figures are given the same references in each of them.

DETAILED DESCRIPTION OF THE INVENTION

As mentioned above, the invention relates to magnetic devices serving to collect metal wear particles in suspension in a lubrication fluid contained in a casing.

Figures 1, 2, 3, 4, 5, 6:
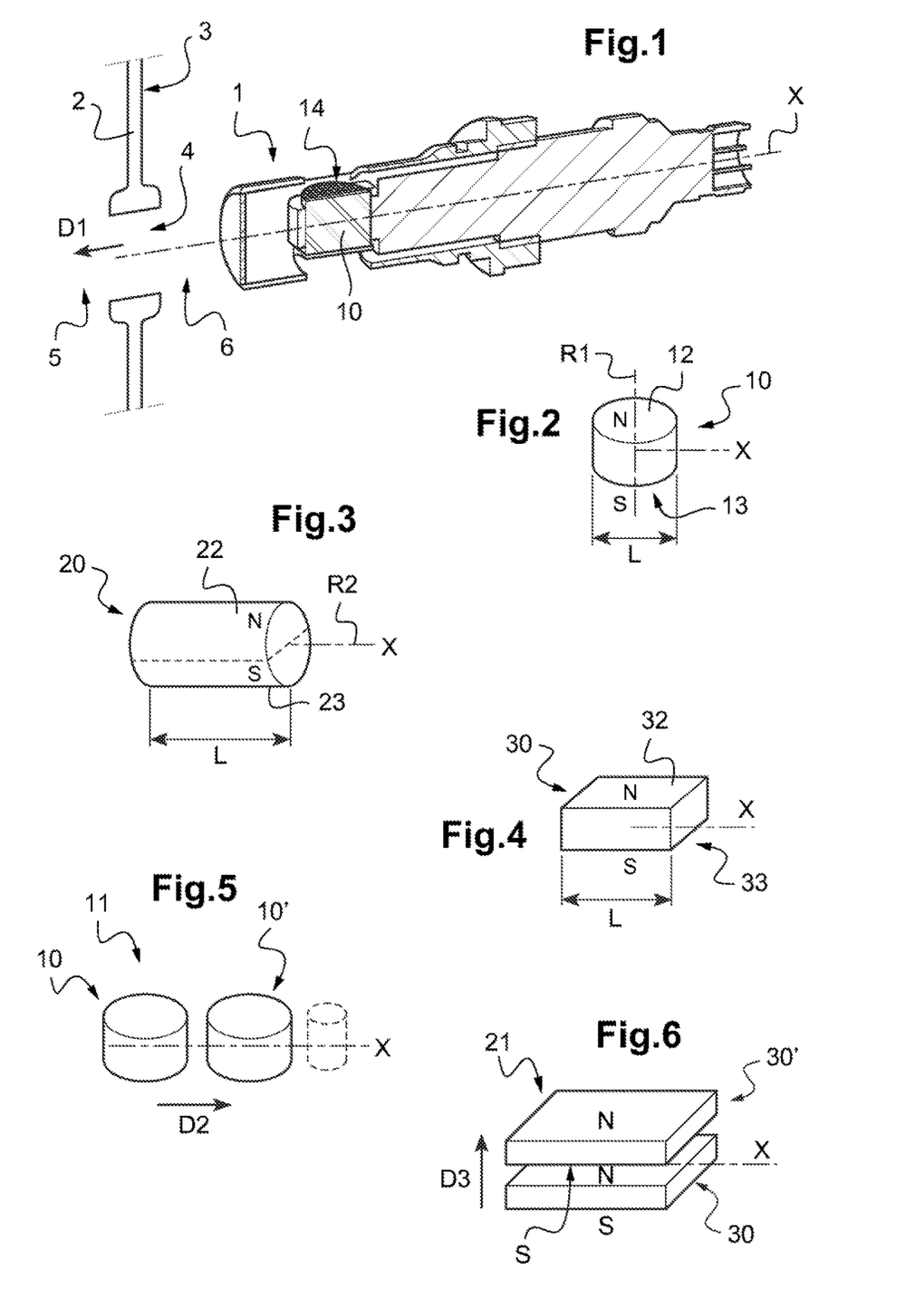
FIG. 1 is a perspective view of a first example of a magnetic device in accordance with the invention.
FIGS. 2 to 4 and 9 to 10 are perspective views of various different permanent magnets in a first variant of the invention.
FIG. 5 is a perspective view of permanent magnets complying both with the first variant of the invention and with a first configuration of the invention.
FIG. 6 is a perspective view of permanent magnets complying both with the first variant of the invention and with a second configuration of the invention.

Thus, as shown in FIG. 1, a magnetic device 1 is for inserting along a straight-line insertion direction D1 of the magnetic device 1 in a wall 2 of a casing 3 presenting a through orifice 4.

Also, this through orifice 4 puts an inside volume 5 of the casing 3 containing the lubrication fluid into communication with an outside volume 6 outside the casing 3. Furthermore, the magnetic device 1 presents a longitudinal axis X that is caused to coincide with the insertion direction DI while the magnetic device 1 is being put into place in the through orifice 4. It should be observed that such an axis X is said to be "longitudinal" in that it extends along a longitudinal dimension of the magnetic device.

Furthermore, and as shown in FIGS. 1 to 28, such a magnetic device 1 comprises at least one permanent magnet 10, 10' 20, 30, 30', 40, 50, 60, 70 suitable for attracting metal particles, the or each permanent magnet having at least two pole faces 12, 22, 32, 42, 52, 62, 72 and 13, 23, 33, 43, 53, 63, 73 of mutually different polarities, and also at least one presence-detector member 14, 14', 24, 34, 44, 64, 74, 84, 94, 104 for detecting the presence of metal particles attracted by the permanent magnet(s) 10, 10', 20, 30, 30', 40, 50, 60, 70.

Also, numerous variants of permanent magnets 10, 10', 20, 30, 30', 40, 50, 60, 70 and of presence-detector members 14, 14', 24, 34, 44, 64, 74, 84, 94, 104 are described below. Likewise, a secure connection between the permanent magnet 10, 10', 23, 30, 30', 40, 50, 60, 70 and the presence-detector member 14, 14', 24, 34, 44, 64, 74, 84, 94, 104 may be provided in various ways, and for example the connection may be of a reversible type in order to make it easier to recover and analyze the metal particles collected by the magnetic device 1, 11, 21, 131. Such a reversible type of connection may be provided in particular by snap fastener means between the removable end of the magnetic device 1, 11, 21, 101 including the presence-detector member 14, 14', 24, 34, 44, 64, 74, 34, 94, 104 and a body of the magnetic device 1, 11, 21, 101 including the permanent magnet 10, 10', 20, 30, 30', 40, 50, 60, 70.

As shown in FIG. 2, such a permanent magnet 10 may be of a shape that is cylindrical about an axis of symmetry R1 arranged perpendicularly relative to the longitudinal axis X.

The permanent magnet 10 then has two circular pole faces 12 and 13 of different polarities, each extending parallel relative to the longitudinal axis X.

Each of the two pole faces 12 and 13 presents a longitudinal dimension L parallel to the longitudinal axis X. Advantageously, such a longitudinal dimension L may lie in the range 1 mm to 50 mm, and preferably in the range 5 mm to 30 mm.

Likewise, and as shown in FIG. 3, the permanent magnet 20 may present a shape that is cylindrical about an axis of symmetry R2 arranged on the longitudinal axis X.

The permanent magnet 20 then has two pole faces 22 and 23 of different polarities that are partially cylindrical, and each of which extends along the longitudinal axis X.

As above, each of the two pole faces 22 and 23 thus presents a longitudinal dimension L parallel to the longitudinal axis X.

As shown in FIG. 4, the permanent magnet 30 may present the shape of a rectangular parallelepiped having four faces that are arranged parallel relative to the longitudinal axis X.

The permanent magnet 30 then has two plane pole faces 32 and 33 of different polarities, each extending parallel relative to the longitudinal axis X.

As above, each of the two pole faces 32 and 33 thus presents a longitudinal dimension L parallel to the longitudinal axis X.

As shown in FIGS. 5 and 6, the magnetic devices 11, 21 may equally well comprise a plurality of permanent magnets 10, 30 and 10', 30' that are juxtaposed.

Thus, as shown in FIG. 5, the permanent magnets 10 and 10' may be arranged one beside the other in a first offset direction D2 that is oriented parallel relative to the longitudinal axis X.

Furthermore, and as shown in FIG. 6, the permanent magnets 30 and 30' may be arranged one above the other in a second offset direction D3 that is oriented perpendicularly relative to the longitudinal axis X.

Furthermore, and in accordance with a first variant of the invention, the permanent magnets 10, 10', 20, 30, and 30' are of the unipolar type having two pole faces 12, 22, 32, and 13, 23, 33 of mutually different polarities. Also, these two pole faces 12, 22, 32, and 13, 23, 33 are advantageously oriented symmetrically relative to the longitudinal axis X.

Figure 7:
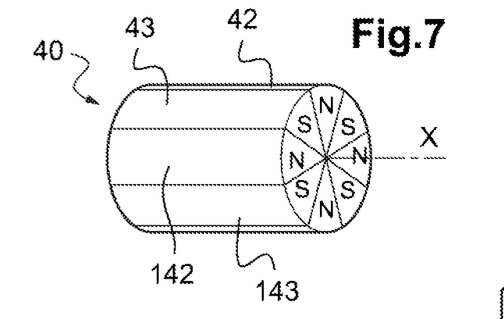
FIGS. 7 to 8 are perspective views of permanent magnets in a second variant of the invention.
Figure 8:
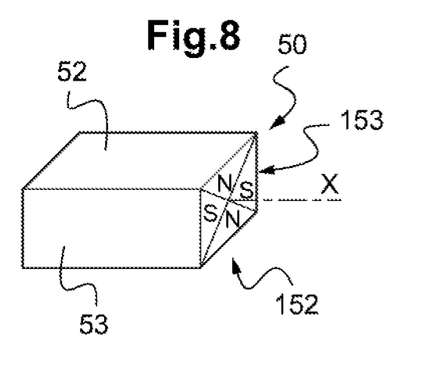

In a second variant of the invention, as shown in FIGS. 7 and 8, the permanent magnets 40 and 50 may equally well be of multipolar type. For example, such permanent magnets 40 and 50 may be manufactured by a sintering process and may constitute a monolithic unit made of a neodymium, iron, and boron alloy commonly designated by the chemical formula $Nd_2Fe_{14}B$.

Under such circumstances, each of the permanent magnets 40 and 50 then has at least four pole faces 42, 52, 43, 53, 142, 152, and 143, 153 that are oriented radially relative to the longitudinal axis X.

As shown in FIG. 7, the pole faces 42, 43, 142, and 143 are arranged beside one another with mutually different polarities in pairs. Such pole faces 42, 43, 142, and 143 constitute cylinder portions of different polarities, each extending along the longitudinal axis X.

Alternatively, and as shown in FIG. 8, the pole faces 52, 53, 152, and 153 may be formed by juxtaposed planes of mutually different polarities. Each such pole face 52, 53, 152, and 153 then extends parallel relative to the longitudinal axis X.

Figure 9:
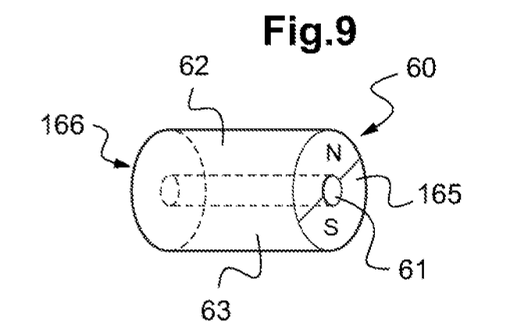

Furthermore, and as shown in FIG. 9, regardless of the type of the permanent magnet, i.e. whether it is unipolar or multipolar, such a permanent magnet 60 may include at least one longitudinal hole 61 extending parallel relative to the longitudinal axis X. The longitudinal hole 61 is then a through hole between a proximal face 165 and a distal face 166 of the permanent magnet 60.

Figure 10:
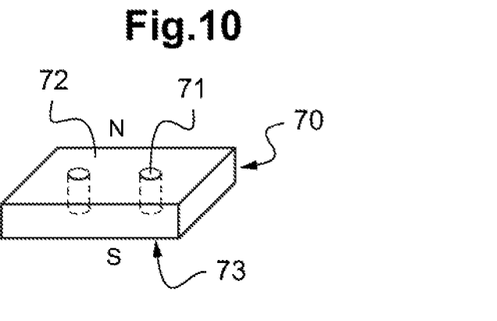

Likewise, and as shown in FIG. 10, regardless of the type of the magnet, i.e. whether it is unipolar or multipolar, a permanent magnet 70 may include at least one through hole 71 extending perpendicularly relative to the longitudinal axis X. Under such circumstances, the through holes 71 are then through holes between a first pole face 72 and a second pole face 73 of the permanent magnet 70.

Also, and as shown in FIGS. 11 to 28, the presence-detector member(s) 14, 14', 24, 34, 44, 64, 74, 34, 94, 104 for detecting metal particles is/are arranged, in full or in part, facing at least two pole faces 12, 22, 32, 42, 52, 62, 72, and 13, 23, 33, 43, 53, 63, 73.

Specifically, and as shown in FIGS. 11 to 14, which correspond to a first embodiment of the invention, the presence-detector members 14 and 14' comprise at least two electrically conductive bars 15, 15' and 16, 16'. Under such circumstances, a first bar 15, 15' is then arranged facing a first pole face 12, 32 of positive polarity, and a second bar 16, 16' is arranged facing a second pole face 13, 33 of negative polarity.

Such bars 15, 15' and 16, 16' may equally well be arranged parallel relative to the longitudinal axis X and they may be spaced apart by a predetermined distance respectively from the first pole face 12, 32 and from the second pole face 13, 33.

Figure 11:
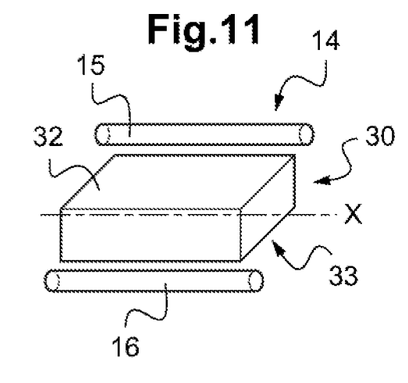
FIGS. 11 to 14 are perspective and cross section views of presence-detector members in a first embodiment of the invention.
Figure 12:
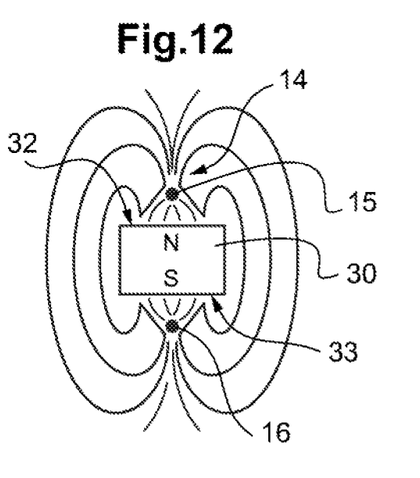

As shown in FIGS. 11 and 12, the presence-detector members 14 comprise a first bar 15 arranged facing the first pole face 32 of positive polarity, and a second bar 16 arranged facing the second pole face 33 of negative polarity.

As mentioned above, under such circumstances, the presence of metal particles is detected by the closing of an initially-open electrical circuit between firstly one of the two bars 15 or 16 and secondly one of the two pole faces 32 or 33 of the permanent magnet 30.

Figure 13:
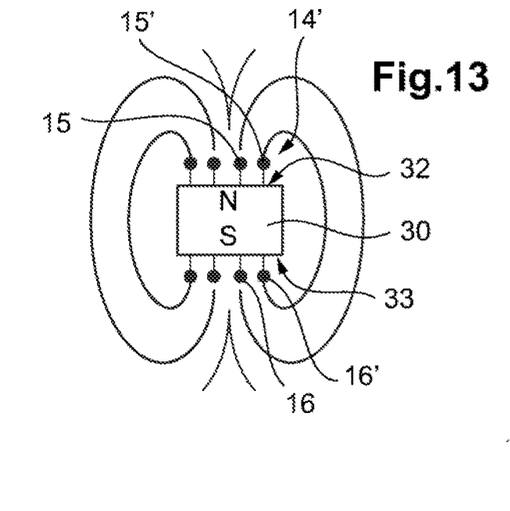
Figure 14:
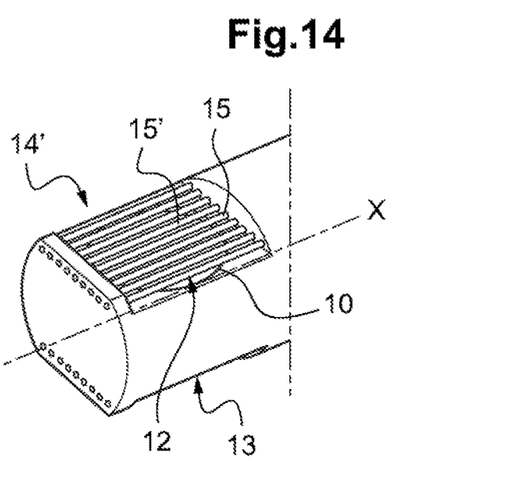

In another representation of the first embodiment of the invention, as shown in FIGS. 13 and 14, the presence-detector members 14' may equally well comprise a plurality of first bars 15, 15' arranged facing the first pole face 12 of positive polarity and a plurality of second bars 16, 16' arranged facing the second pole face 13 of negative polarity.

Figures 15, 16, 17, 18:
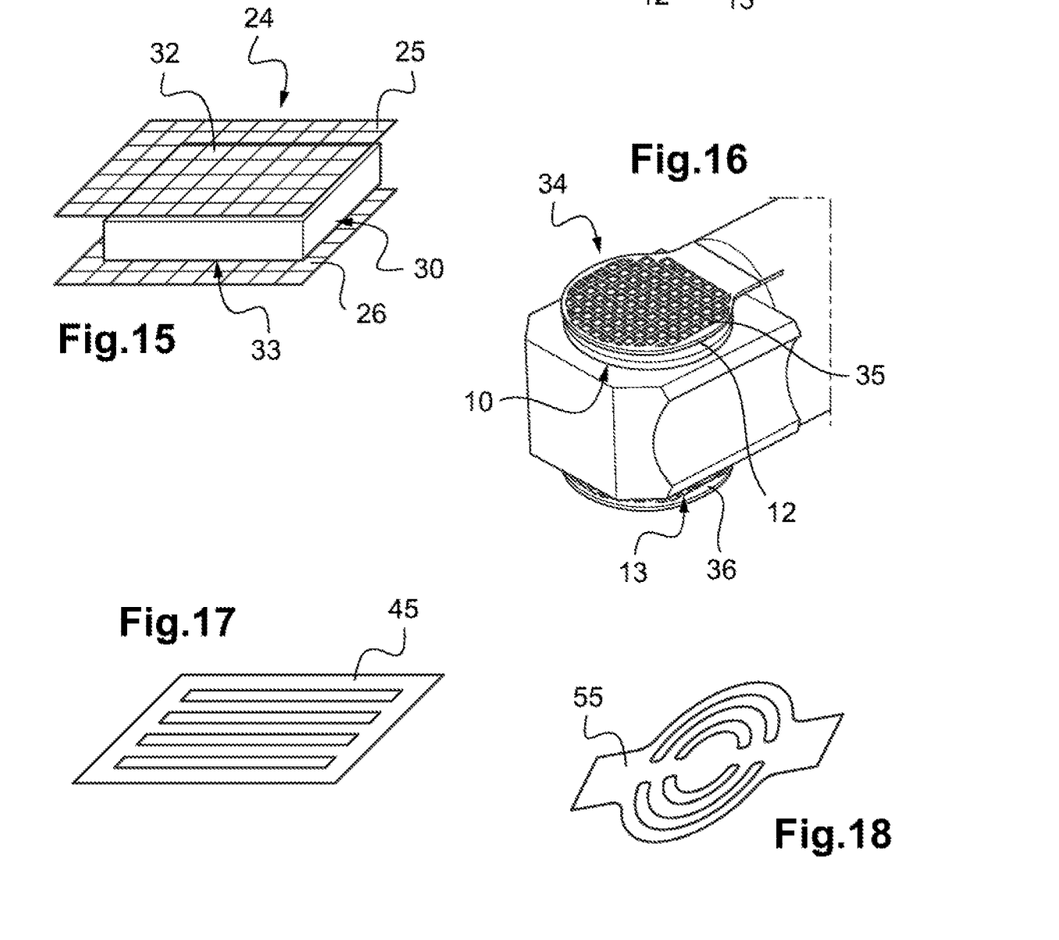
FIG. 15 is a perspective view of presence-detector members in a second embodiment of the invention.
FIGS. 16 to 18 are perspective views of various different presence-detector members in a third embodiment of the invention.

In a second embodiment of the invention as shown in FIG. 15, the presence-detector member 24 for detecting metal particles comprises two groups 25 and 26 of two oriented sheets of electrically conductive wires forming e grid or an open weave textile. Also, a first group 25 is arranged facing the first pole face 32 of negative polarity, and a second group 26 is arranged facing the second pole face 33 of negative polarity.

As mentioned above, the presence of metal particles is detected by the closing of an initially-open electrical circuit between firstly one of the two groups 25 or 26 and secondly one of the two pole faces 32 or 33 of the permanent magnet 30.

In a third embodiment of the invention, as shown in FIGS. 16 to 18, the presence-detector members 34 for detecting metal particles may comprise two electrically conductive perforated plates 35, 45, 55, and 36. Thus, a first place 35, 45, 55 is arranged facing the first pole face 12 of negative polarity and a second plate 36 is arranged facing a second pole face 13 of negative polarity.

As shown, the perforations in the first and second perforated plates 35, 45, 55, and 36 may present various different shapes, such as, in particular, squares, rectangles, or indeed annular portions.

Figures 19, 20, 21, 22, 23:
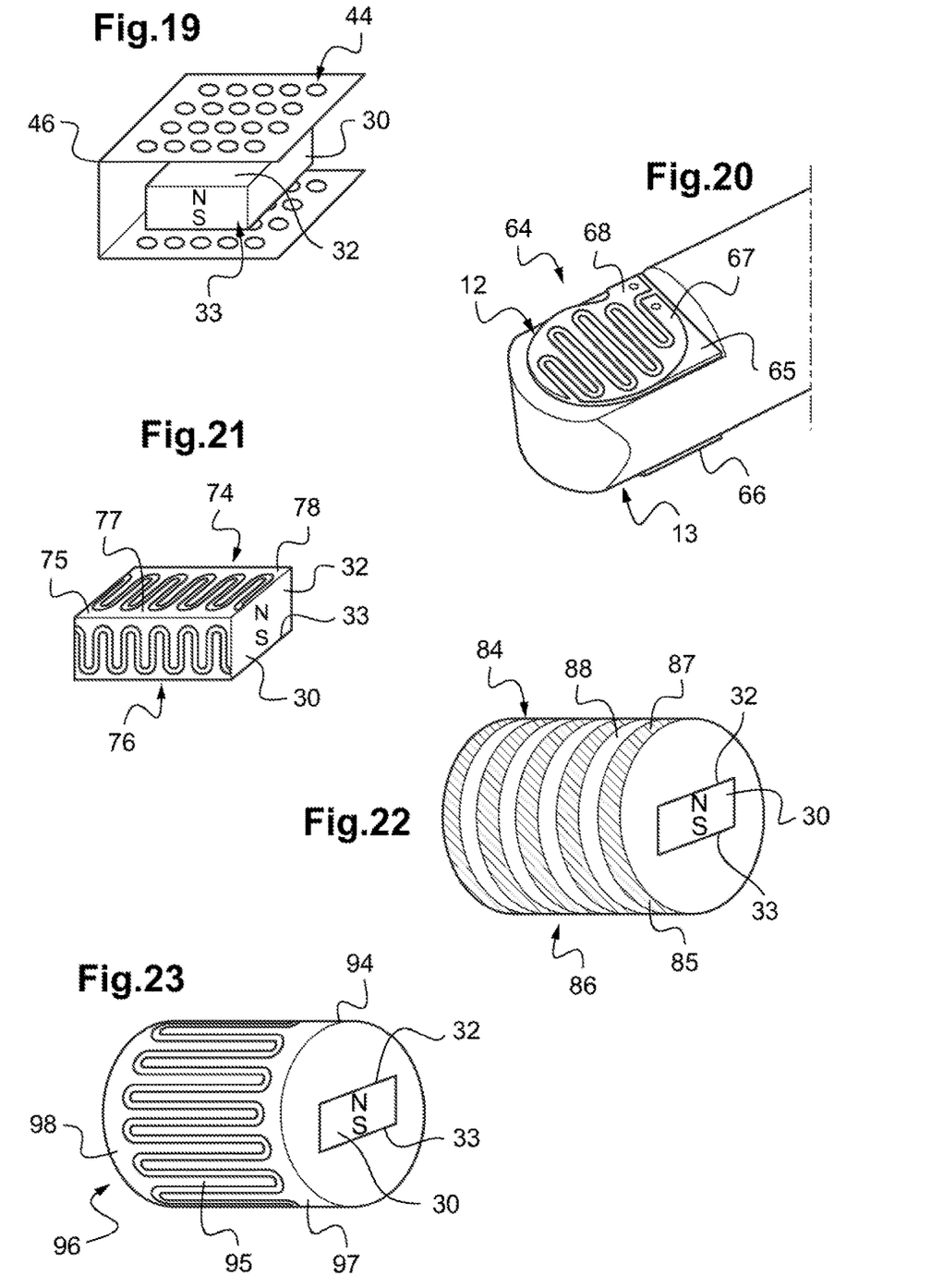
FIGS. 20 and 21 are perspective views of various different presence-detector members in a fourth embodiment of the invention.
FIGS. 19, 22, and 23 are perspective views of various different presence-detector members in a fifth embodiment of the invention.

In a fourth embodiment of the invention, as shown in FIGS. 20 and 21, the presence-detector members 64, 74 for detecting metal particles comprise two printed circuits 65, 75 and 66, 76, each having two different electrically conductive tracks 67, 77 and 63, 78 that are electrically insulated from each other. Thus, a first printed circuit 65, 75 is then arranged facing a first pole face 12, 32 of positive polarity, and a second printed circuit 66, 76 is arranged facing a second pole face 13, 33 of negative polarity.

Under such circumstances, the presence of metal particles on each of the two printed circuits 65, 75 and 66, 76 may be detected by the closing of an initially-open electrical circuit between one of the two electrically conductive tracks 67, 77 and the other electrically conductive track 68, 78.

In addition, in a fifth embodiment of the invention, as shown in FIG. 19, the presence-detector member 44 for detecting metal particles may comprise a monolithic unit 46 made up of a perforated plate surrounding the permanent magnet 30, at least in part, and covering the first pole face 32 of positive polarity and the second pole face 33 of negative polarity.

In other representations of this fifth embodiment of the invention, and as shown in FIGS. 22 and 23, the presence-detector member 34, 94 for detecting metal particles may comprise a monolithic unit 86, 96 forming a printed circuit 85, 95 having two different electrically conductive tracks 37, 97 and 88, 98 that are electrically insulated from each other. Under such circumstances, such a printed circuit 85, 95 surrounds the permanent magnet 30 completely.

Furthermore, the outside volume occupied by the printed circuit 85, 95 may be cylindrical shape or it may be in the shape of a rectangular parallelepiped.

In a sixth embodiment of the invention, as shown in FIGS. 24 to 28, the presence-detector member 104 for detecting metal particles may comprise a plurality of electrically conductive hollow plates 105, 106 that are separated from one another by a plurality of electrically insulating hollow plates 107. In practice, the electrically conductive hollow plates 105, 106 and the insulating hollow plates 107 are then arranged parallel to one another and perpendicularly relative to the longitudinal axis X of the magnetic device 101.

Figures 24, 25, 26, 27, 28:
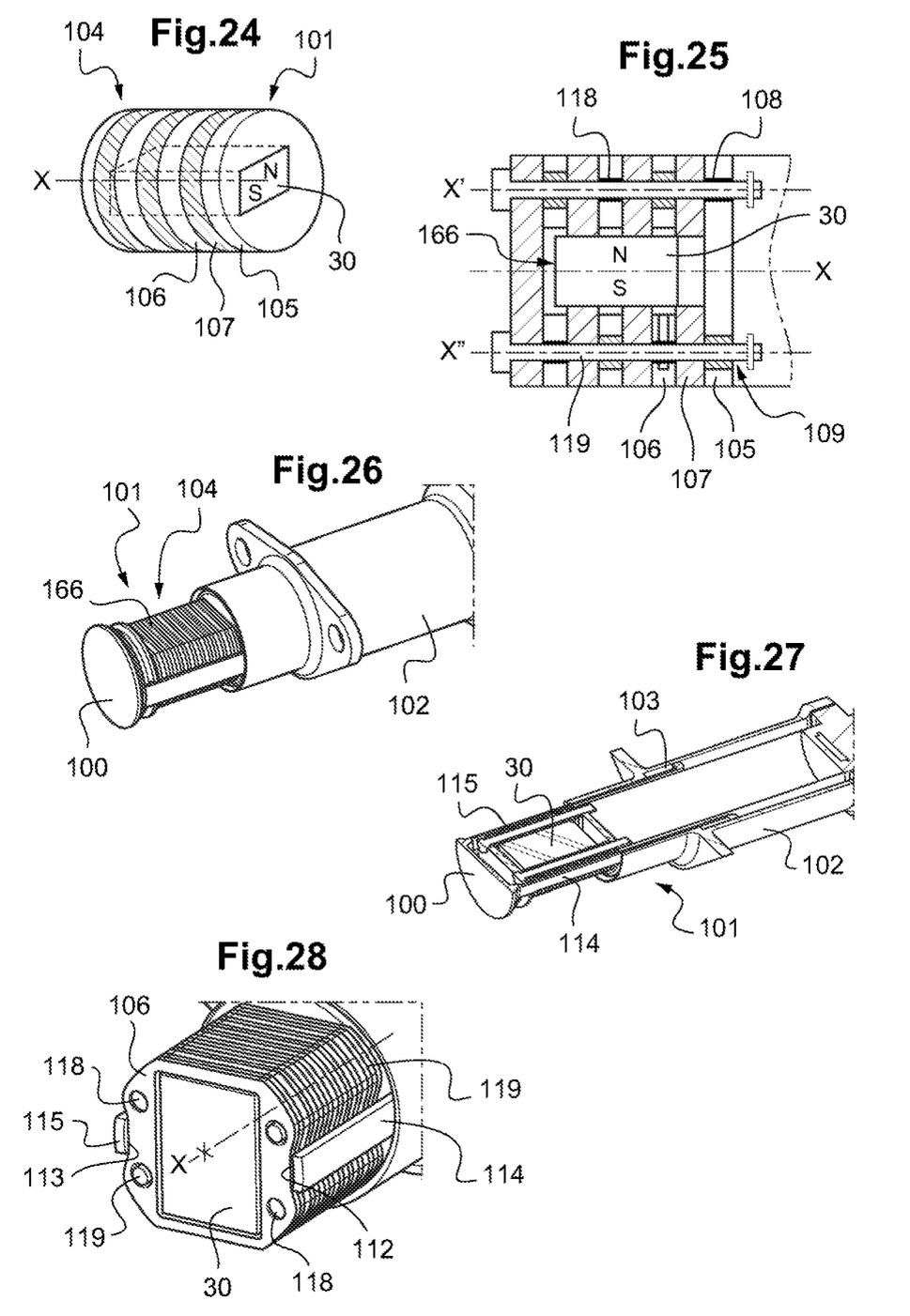
FIGS. 24 to 28 are perspective views of various different presence-detector members in a sixth embodiment of the invention.

Also, as shown in FIG. 25, the electrically conductive hollow plates 105, 106 and the insulating hollow plates 107 may each present at least two respective through bores 108, 109. Under such circumstances, first bores 103 in the electrically conductive hollow plates 105, 106 and in the insulating hollow plates 107 are arranged in axial alignment along a first axis X' and second bores 109 in the electrically conductive hollow plates 105, 106 and in the insulating hollow plates 107 are arranged in axial alignment along a second axis X".

Furthermore, the first and second axes X' and X" are arranged in parallel with the longitudinal axis X of the magnetic device 101. Such through bores 108, 109 then make it possible, via a first conductive rod 118, to connect together electrically firstly the plates of a first set of electrically conductive hollow plates 105, and, via a second conductive rod 119, to connect together electrically a second set of electrically conductive hollow plates 106.

Under such circumstances, and like the detector members comprising one or more printed circuits, the presence of metal particles may be detected by the closing of an initially-open electrical circuit between one of the electrically conductive hollow plates 105 and one of the electrically conductive hollow plates 106.

Furthermore, and as shown in FIGS. 26 to 28, the magnetic device 101 may also include a shutter 100 arranged facing a distal face 166 of the permanent magnet 30 and perpendicularly relative to the longitudinal axis X. Under such circumstances, the electrically conductive hollow plates 105, 106 and the insulating hollow plates 107 may each present at least two respective notches 112 and 113 that are mutually symmetrical relative to the longitudinal axis X.

Such notches 112 and 113 then enable two branches 114 and 115 that are parallel to the longitudinal axis X to support the shutter 100.

Furthermore, such a shutter 100 may be associated with resilient return means 103 serving to shut the casing automatically when the permanent magnet 30 and the presence-detector member 104 for detecting metal particles are extracted from the magnetic device 101.

Also, the shutter 100 may be arranged to move in translation relative to the support 102 for fastening the magnetic device 101 on the casing 3. Such a shutter 100 may then be moved in a first travel direction parallel to the longitudinal axis X towards a shut position by the resilient return means 103. In contrast, when the permanent magnet 3C and the presence-detector member 104 for detecting metal particles are inserted once more into the support 102 for fastening the magnetic device 101, the shutter 100 is moved in a second travel direction opposite to the first travel direction towards an open position.

As shown in FIG. 28, such a magnetic device 101 may include a first set of two first conductive rods 119 serving both to interconnect, electrically the plates of the first set of electrically conductive hollow plates 105 and also to center them relative to the longitudinal axis X. Likewise, the magnetic device 101 may also include a second set of two second conductive rods 118 serving both to interconnect electrically the plates of the second set of electrically conductive hollow plates 106 and also to center them relative to the longitudinal axis X.

Naturally, the present invention nay be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present in

What is claimed is:

1. A magnetic device for capturing metal wear particles in suspension in a lubrication fluid, the magnetic device being for inserting in a straight-line insertion direction of the magnetic device into a wall of a casing via a through orifice serving to put an inside volume of the casing containing the lubrication fluid into communication with an outside volume outside the casing, the magnetic device presenting a longitudinal axis X, the longitudinal axis X being for putting into coincidence with the direction for inserting the magnetic device into the casing, the magnetic device comprising:
- at least one permanent magnet suitable for attracting the metal particles, the permanent magnet(s) having at least two pole faces of mutually different polarities; and
- at least one presence-detector member for detecting the presence of the metal particles attracted by the permanent magnet(s);
- the pole faces extending respectively mainly along the longitudinal axis X, and the presence-detector member(s) for detecting the metal particles being arranged, in full, facing the pole faces and;
- wherein the presence-detector member(s) for detecting the metal particles are arranged such that they only face the pole faces, and wherein each of the pole faces presents a respective longitudinal dimension L parallel to the longitudinal axis X.

2. The device according to claim 1;
wherein the permanent magnet(s) occupies an outside volume of shape selected from the group comprising cylinders and rectangular parallelepipeds.

3. The device according to claim 1;
wherein the magnetic device comprises at least two permanent magnets arranged one beside the other in a first offset direction that is oriented parallel relative to the longitudinal axis X.

4. The device according to claim 1;
wherein the magnetic device comprises at least two permanent magnets arranged one above the other in a second offset direction that is oriented perpendicularly relative to the longitudinal axis X.

5. The device according to claim 1;
wherein the permanent magnet(s) is/are of unipolar type, having two pole faces of mutually different polarities, the two pole faces being oriented symmetrically relative the longitudinal axis X.

6. The device according to claim 1;
wherein the permanent magnet(s) is/are of multipolar type, having at least four pole faces that are oriented radially relative the longitudinal axis X, the pole faces being arranged beside one another and being of mutually different polarities in pairs.

7. The device according to claim 1;
wherein the permanent magnet(s) include(s) at least one longitudinal hole extending parallel relative to the longitudinal axis X, the longitudinal hole(s) being a through hole between a proximal face of the permanent magnet(s) and a distal face of the permanent magnet(s).

8. The device according to claim 1;
wherein the permanent magnet(s) include(s) at least one transverse hole extending perpendicularly relative to the longitudinal axis X, the transverse hole(s) being a through hole between a first pole face of the permanent magnet(s) and a second pole face of the permanent magnet(s).

9. The device according to claim 1;
wherein the presence-detector member(s) for detecting the metal particles comprise(s) at least two electrically conductive bars, a first bar being arranged facing a first pole face of positive polarity and a second bar being arranged facing a second pole face of negative polarity.

10. The device according to claim 1;
wherein the presence-detector member(s) for detecting the metal particles comprise(s) two groups of two oriented sheets of electrically conductive wires forming a grid or an open weave textile, a first group being arranged facing a first pole face of positive polarity and a second group being arranged facing a second pole face of negative polarity.

11. The device according to claim 1;
wherein the presence-detector member(s) for detecting the metal particles comprise(s) two electrically conductive perforated plates, a first plate being arranged facing a first pole face of positive polarity and a second plate being arranged facing a second pole face of negative polarity.

12. The device according to claim 1;
wherein the presence-detector member(s) for detecting the metal particles comprise(s) two printed circuits, each having two different electrically conductive tracks that are electrically insulated from each other, a first printed circuit being arranged facing a first pole face of positive polarity and a second printed circuit being arranged facing a second pole face of negative polarity.

13. The device according to claim 1;
wherein the presence-detector member(s) for detecting the metal particles comprise(s) a monolithic unit surrounding the permanent magnet(s), at least in part, and covering a first pole face of positive polarity and a second pole face of negative polarity.

14. The device according to claim 13;
wherein the monolithic unit forms a printed circuit having two different electrically conductive tracks that are electrically insulated from each other.

15. The device according to claim 14;
wherein the printed circuit surrounds the permanent magnet(s) completely, the printed circuit occupying an outside volume of shape selected from the group comprising cylinders and rectangular parallelepipeds.

16. The device according to claim 1;
wherein the presence-detector member(s) for detecting the metal particles comprise(s) a plurality of electrically conductive hollow plates that are separated from one another by a plurality of electrically insulating hollow plates, the electrically conductive hollow plates and the insulating hollow plates being arranged parallel to one another and perpendicularly relative to the longitudinal axis X.

17. The device according to claim 16;
wherein each of the electrically conductive hollow plates and of the insulating hollow plates presents at least two respective through bores, first bores in the electrically conductive hollow plates and in the insulating hollow plates being in mutual alignment along a first axis X' and second bores in the electrically conductive hollow plates and in the insulating hollow plates being in mutual alignment along a second axis X'', the first and second axes X' and X'' being parallel to the longitudinal axis X.

18. The device according to claim 16;
wherein the magnetic device includes a shutter arranged facing a distal face of the permanent magnet(s) and perpendicularly relative to the longitudinal axis X, each of the electrically conductive hollow plates and of the insulating hollow plates presenting at least two respective notches arranged symmetrically relative to the longitudinal axis X, the notches being suitable for receiving two branches that are parallel to the longitudinal axis X, the two branches being secured to the shutter.

19. The device according to claim 1;
wherein each of the pole faces presents a respective longitudinal dimension L parallel to the longitudinal axis X lying in the range 1 mm to 50 mm.

20. A magnetic device for capturing metal wear particles in suspension in a lubrication fluid, the magnetic device being for inserting in a straight-line insertion direction of the magnetic device into a wall of a casing via a through orifice serving to put an inside volume of the casing containing the lubrication fluid into communication with an outside volume outside the casing, the magnetic device presenting a longitudinal axis X, the longitudinal axis X being for putting into coincidence with the direction for inserting the magnetic device into the casing, the magnetic device comprising:

at least one permanent magnet suitable for attracting the metal particles, the permanent magnet(s) having at least two pole faces of mutually different polarities; and at least one presence-detector member for detecting the presence of the metal particles attracted by the permanent magnet(s);

the pole faces extending respectively mainly along the longitudinal axis X, and the presence-detector member(s) for detecting the metal particles being arranged, in full or in part, facing the pole faces;

wherein each of the pole faces presents a respective longitudinal dimension L parallel to the longitudinal axis X lying in the range 1 mm to 50 mm; and wherein the presence-detector member(s) for detecting the metal particles comprise(s) two printed circuits, each having two different electrically conductive tracks that are electrically insulated from each other, a first printed circuit being arranged facing a first pole face of positive polarity and a second printed circuit being arranged facing a second pole face of negative polarity.

* * * * *